United States Patent

[15] 3,662,190

Naber

[45] May 9, 1972

[54] CONTROL CIRCUIT FOR SINGLE STROKE ELECTRICAL TOOLS

[72] Inventor: Joseph S. Naber, Marengo, Ill.
[73] Assignee: Fastener Corporation, Franklin Park, Ill.
[22] Filed: June 16, 1969
[21] Appl. No.: 833,321

[52] U.S. Cl. ............ 307/252 N, 307/252 UA, 307/246, 307/293
[51] Int. Cl. .............................................. H03k 17/00
[58] Field of Search ........... 307/252, .54, .74, 252 J, 252 I, 307/252 UA, 252 L, 293

[56] References Cited

UNITED STATES PATENTS

| | | | |
|---|---|---|---|
| 3,158,758 | 11/1964 | Pearson, Jr. | 307/252 X |
| 3,249,807 | 5/1966 | Nuckolls | 307/252 |
| 3,296,419 | 1/1967 | Sels | 307/252 |
| 3,358,218 | 12/1967 | Halpin | 323/22 |
| 3,495,098 | 2/1970 | Albrecht | 307/252 |

*Primary Examiner*—Donald D. Forrer
*Assistant Examiner*—B. P. Davis
*Attorney*—Mason, Kolehmainen, Rathburn & Wyss

[57] ABSTRACT

A simplified control circuit for a single stroke electrical tool comprises a first triggerable gate connected in series with the tool across a source of supply. A series circuit including a second gate, a trigger capacitor, and a manually actuated switch is then connected between a trigger terminal and a current terminal of the first gate. A silicon controlled rectifier pulse generating circuit supplies synchronizing pulses of one polarity to the second gate and charging current of the opposite polarity to the trigger capacitor. Positive feedback from the trigger terminal of the first gate to the input of the second gate gives improved triggering sensitivity and renders the circuit relatively insensitive to changes in the value of components. Multiple firing is prevented by connecting a resistor or diode between the trigger capacitor circuitry and the trigger terminal of the first gate, and by utilizing the voltage drop across the load to aid in fully discharging the trigger capacitor.

20 Claims, 3 Drawing Figures

PATENTED MAY 9 1972 3,662,190
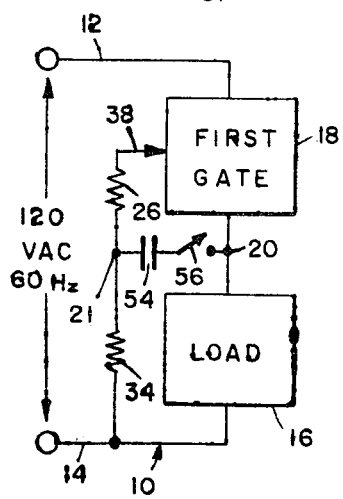
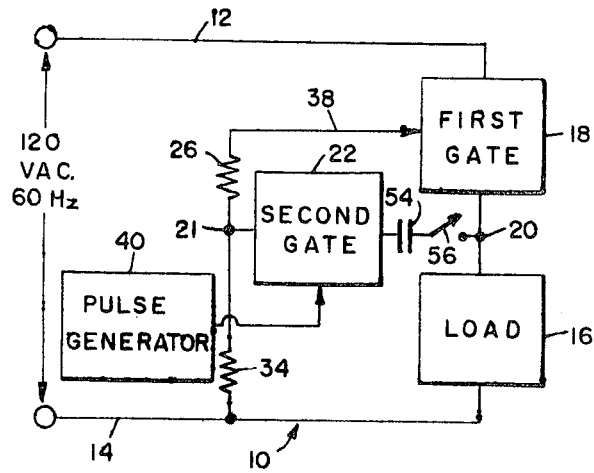
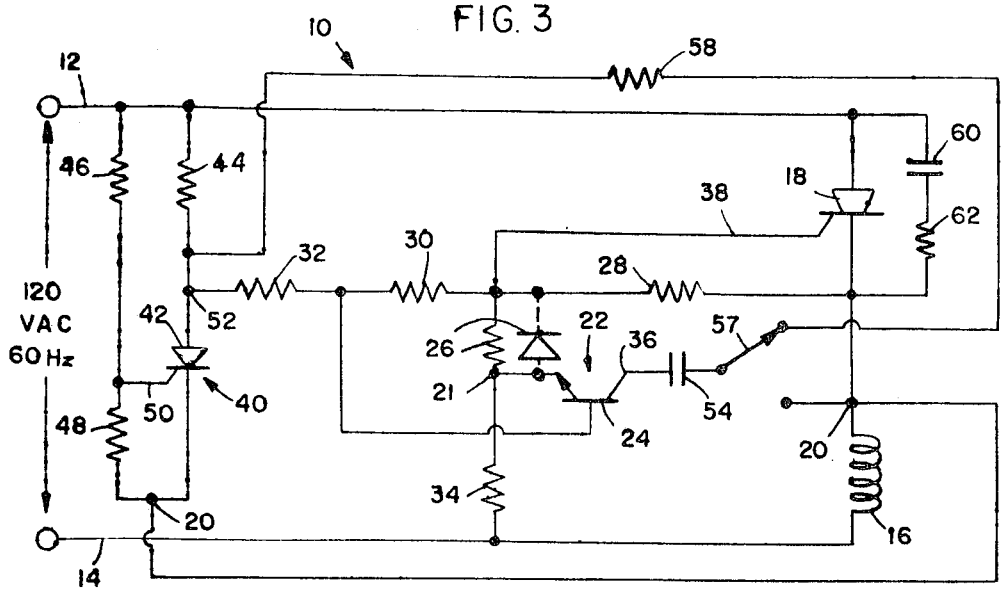
INVENTOR:
JOSEPH S. NABER
BY
ATT'YS

CONTROL CIRCUIT FOR SINGLE STROKE ELECTRICAL TOOLS

This invention relates to a circuit for controlling the energization of a load and, more particularly, to such a circuit for controlling an electrically operated fastener driving tool.

U.S. Pat. No. 3,179,866, assigned to the same assignee as the present application, discloses an electrically operated fastener driving tool that is completely self-contained in the sense that all of the driving components and the power supply therefor are carried on the housing of the tool. This tool includes a fastener driving element or blade actuated by a winding means that is selectively connected to an alternating current potential source for no more than one cycle of the potential by a manually actuated power supply or control circuit carried on the housing. During the momentary energization of the winding, the fastener driving blade is driven through a single power stroke during which the fastener or staple is driven, and the tool cannot be reoperated through an additional power stroke until the manually actuated control means is released and reoperated. This tool is capable of continuous use without excessive heating, provides adequate driving power and is easily controlled in requiring the actuation of only a single switching means.

Control circuits of the type disclosed in the above-mentioned patent generally utilize a trigger capacitor to trigger a silicon controlled rectifier. This capacitor is discharged quickly to prevent a second firing. Occasionally, however, circuits of this type allow a second, and even a third firing to occur. This not only can overload the source of power, but it also can be dangerous to the operator, especially in a machine that automatically reloads itself between firings.

Such circuits also tend to be somewhat bulky, mainly because they usually include in their circuitry electrolytic capacitors having capacity values of 10 microfarads or greater, and oftentimes having capacity values in excess of 100 microfarads. These capacitors are not only expensive and physically large in size, but they also are subject to deterioration with time, and are a frequent cause of malfunction.

A primary object of the present invention is therefore the production of a control circuit that is less expensive, more compact, and more reliable than control circuits currently in use.

A more specific object of the present invention is the production of a control circuit in which a margin of safety is provided against multiple firings.

A further object of the present invention is the production of a control circuit that does not include any large capacity capacitors.

Briefly stated, a control circuit designed in accordance with the present invention comprises a first triggerable gate connected in series with a solenoid or load across a source of alternating current potential, and a trigger capacitor that is connected in series with a manual switch and a second synchronized gate between a control input and a current terminal of the first triggerable gate. A diode or resistor element is connected in series with the gate control input to prevent triggering of the gate before the trigger capacitor applies a substantial voltage to the resistor or diode element. A second resistor serially connects the resistor or diode element to the opposite side of the load, thereby applying a reverse bias to the gate control input under standby conditions and insuring that the trigger capacitor is fully discharged after each operation of the circuit. A feedback resistor connects the first triggerable gate control input to the input of the second synchronized gate. This resistor applies additional reverse bias current to the gate control input, improves triggering sensitivity, and renders the circuit relatively insensitive to changes in the values of components. To prevent the gate control input from being biased in a reverse direction beyond its breakdown potential, and also to further suppress any tendency of the circuit to trigger before a substantial potential is applied to the gate control input, another resistor is connected from the gate control input to the adjacent current terminal of the first triggerable gate. All of the above circuit features combine to produce a circuit which is highly unlikely ever to fire a second time.

The synchronized gate is enabled at the start of every positive half cycle by trigger pulses generated by a pulse generator. The pulse generator comprises a silicon controlled rectifier connected in series with a resistor across a suitable source of potential. When the potential across this network goes positive, a voltage pulse momentarily appears across the controlled rectifier and then is terminated when the device becomes conductive. The gate of the controlled rectifier is biased so that this pulse only appears during the initial or leading portion of each positive half cycle. These pulses are fed into the second synchronized gate. This arrangement insures that the triggerable gate always connects the load to the supply voltage for close to a complete half cycle, rather than for just a portion of the half cycle, and prevents the trigger capacitor from discharging during negative half cycles. During negative half cycles the controlled rectifier remains nonconductive, and therefore can be used as a convenient source of negative current for recharging the trigger capacitor.

Preferably the manual switch is a single pole, single throw switch connecting one end of the trigger capacitor to a current terminal of the first triggerable gate or to one of the supply terminals. Charging current for the trigger capacitor can then flow through a resistor connected between this same end of the trigger capacitor and the pulse generator. Under certain circumstances, however, a single pole double throw switch must be used to alternately switch the trigger capacitor between the source of charging current and the current or supply terminal.

The only capacitor in the control circuit is the trigger capacitor, which need only be large enough to supply a trigger current pulse to the triggerable gate. Typically, this capacitor will have a value of 0.1 or 0.2 microfarads. Thus, electrolytic capacitors are not required, and the maintenance, cost, and packaging problems created by electrolytic capacitors cannot arise. The resulting circuit is simple, reliable, and inexpensive. After each firing of the triggerable gate, the trigger capacitor is fully discharged. Since a trigger capacitor charge in excess of ten volts would be required to trigger the circuit a second time, a safety margin is provided against possible multiple firings which might otherwise be caused by noise pulses, improper tolerances, or faulty switch contacts.

Further objects, features, and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which:

FIG. 1 is a simplified block diagram of a controller circuit designed in accordance with the present invention;

FIG. 2 is a block diagram of a controller circuit designed in accordance with the present invention and including synchronization means; and FIG. 3 is a complete schematic diagram of a controller circuit designed in accordance with the present invention.

Referring now to FIG. 1, there is shown a simplified block diagram of a control circuit designed in accordance with the present invention and indicated by the reference numeral 10. The control circuit 10 is energized by a source of a 120 volt AC, 60 HZ current which is supplied to two supply nodes 12 and 14. Connected between the supply nodes 12 and 14 is a series circuit comprising a first triggerable gate 18 connected in series with a solenoid or load 16. The node 20 common to both of these elements is called the common node. A trigger node 21 is connected to a gate or control terminal 38 of the first gate 18 by a diode or resistor 26 (if a diode is used, its anode is adjacent the trigger node 21, as shown with dashed lines in FIG. 3). The trigger node 21 is also connected to the supply node 14 by a resistor 34. The two nodes 20 and 21 are connected together by a series circuit that includes a trigger capacitor 54 and a switch 56.

The gate 18 is assumed to be a silicon controlled rectifier, a silicon controlled switch, a thyratron, or some equivalent form of triggerable gating device or circuit. While triggerable gates of this type come in a variety of types and polarities, it will be assumed for purposes of discussion that the gate 18 is of a type such that a positive current supplied to the control terminal 38 causes the gate 18 to conduct, but only when the supply node 12 is positive with respect to the common node 20.

Initially the switch 56 is open, and the first gate 18 is non-conducting. No current flows through the load 16 and negligible current flows through the resistors 34 and the resistor or diode 26, and the control terminal 38 is at approximately the same potential as the supply node 14. No current flows into the control terminal 38. The use of a diode for element 26 further resists current flow into the control terminal 38, since any such current has to overcome the junction potential of the diode before it can flow into the control terminal 38. Thus, the gate 18 remains non-conductive. The trigger capacitor 54 is assumed to be initially charged by any convenient charging means, so that the end of the capacitor 54 connected to the trigger node 21 is charged positively with respect to the end of the capacitor 54 connected to the switch 56. If the switch 56 is now closed at the start of a half cycle when the supply node 12 is positive with respect to the supply node 14, a positive current flows through the loop comprising the resistor or diode 26, the control terminal 38, the gate 18, the switch 56, and the capacitor 54. This current triggers the first gate 18 and causes it to connect the common node 20 to the supply node 12. In this manner, a positive half cycle of potential is impressed upon the load 16.

While this positive half cycle is impressed across the load 16, the capacitor 54 is charged oppositely from its initial charge by current flowing through the resistor 34. Thus, at the end of the positive half cycle, the capacitor 54 is left with a reverse negative charge with tends to hold the trigger node 21 negative with respect to the common node 20.

During the negative half cycle which follows, the gate 18 ceases to conduct, the flow of current to the load 16 stops, and the negative potential developed across the capacitor 54 disappears, leaving the capacitor 54 essentially discharged. When once again the supply node 12 goes positive with respect to the supply node 14, the trigger capacitor 54 cannot supply any further current to the control terminal 38. Since it takes a substantial potential across the capacitor 54 to force enough current through the resistor or diode 26, a potential margin against multiple firing of the gate 18 is provided.

FIG. 2 shows the control circuit 10 in more detail, and in particular includes those elements of the circuit 10 which synchronize the discharge of the trigger capacitor 54 with leading edge of a positive half cycle of the supply current. In particular, a second gate 22 and a positive half cycle leading edge pulse generator 40 are added to the circuit 10. The second gate 22 is connected in series with the trigger capacitor 54 and the switch 56. This second gate 22 prevents the trigger capacitor 54 from discharging and supplying current to the control terminal 38 of the first gate 18 until the leading edge of a positive half cycle. The second gate 22 is enabled only when the pulse generator 40 is generating a positive pulse. The pulse generator 40 is arranged to generate a narrow positive pulse whenever the supply node 12 goes positive with respect to the supply node 14. The details of the pulse generator 40 are disclosed below in the discussion concerning FIG. 3. The switch 56 may be thrown at any time, and does not need to be thrown at the start of a positive half cycle. The second gate 22 prevents a closure of the switch 56 from having any effect until the proper time.

Referring now to FIG. 3, there is shown a complete schematic diagram of the control circuit 10. The first gate 18 is a conventional silicon controlled rectifier. The load 16 is shown as an inductance or solenoid. This would typically be the case, since most tools of this type are solenoid actuated. The second gate 22 comprises a transistor 24 having its emitter electrode connected to the trigger node 21, its base electrode connected to the pulse generator 40, and its collector electrode 36 connected to the trigger capacitor 54. A single pole double throw (SPDT) switch 57 replaces the single pole single throw (SPST) switch 56 of FIGS. 1 and 2. As will be explained in more detail below, a single pole single throw (SPST) switch can also be used to trigger the circuit.

The pulse generator 40 comprises basically a silicon controlled rectifier 42 connected in series with a resistor 44. This series circuit is connected between the supply node 12 and the common node 20, as shown. The control terminal 50 of the silicon controlled rectifier 42 is connected to the common node 20 by a resistor 48 and to the supply node 12 by a resistor 46. A node 52 is the node common to both the resistor 44 and the controlled rectifier 42 and is connected to the second gate 22 by a resistor 32.

Assuming for the moment that the triggerable gate 18 is nonconductive, no current flows through the load 16, and the common node 20 is at the same potential as the supply node 14. The pulse generator 40 can thus be thought of as connected directly between the supply nodes 12 and 14. When the supply node 12 is negative with respect to the supply node 14, the controlled rectifier 42 is reverse biased and does not conduct. Since the node 52 is connected to the supply node 12 by the resistor 44, the node 52 goes negative along with the supply node 12. This large negative potential is used to charge the trigger capacitor 54, as will be explained below. When the supply node 12 again goes positive with respect to the supply node 14, initially the controlled rectifier 42 remains unconductive, and the node 52 goes positive along with the node 12. This positive voltage at the node 52 causes a current to flow through the resistor 32 and into the gate 22. This current actuates the gate 22 by causing a transistor 24 to conduct. This current is allowed to flow for only a brief time, however, because soon the potential of the node 12 goes far enough positive so that current through the resistor 46 flows into the control terminal 50 and triggers the controlled rectifier 42 into conduction. This effectively connects the node 52 to the node 20 and thus cuts off the flow of current through the resistor 32. The values of the resistors 46 and 48 are chosen to cause conduction in the controlled rectifier 42 at the proper time. Thus, a positive potential appears at the node 52 and enables the gate 22 for only a short period immediately following the leading edge of a positive half cycle of supply current.

The trigger capacitor 54 is recharged whenever the switch 57 is in the position shown in FIG. 3. During negative half cycles when the supply node 14 is positive with respect to supply node 12, current flows from the supply node 14, through the load 16, the resistors 28 and 30, and the base-collector junction of the transistor 24 to the trigger capacitor 54. Simultaneously current flows out of the trigger capacitor 54, through the switch 57, a resistor 58, and the resistor 44 to the supply node 12. This current charges the trigger capacitor 54 and leaves it with a large negative charge.

As mentioned above, a single pole single throw switch can be used in place of a single pole double throw switch 57, if desired. The switch is connected between the capacitor 54 and the node 20, as shown in FIG. 2. The resistor 58 (FIG. 3) is then connected directly to the end of the capacitor 54 adjacent the switch. When the switch is closed to initiate a discharge, the switch shorts the resistor 58 to the common node 20 and thus prevents the capacitor 54 from recharging until the switch is opened. The single pole single throw configuration gives entirely satisfactory results. However, when the invention is used in a tool that recoils, it has been found that certain types of switches have contacts which open when the tool recoils, thereby permitting the capacitor 54 to recharge prematurely. With such a recoil sensitive switch the single pole double throw configuration is preferable, since it gives more protection against multiple firing.

The resistors 30 and 32 form a voltage divider which couples the positive pulses from the node 52 to the base of the transistor 24. By connecting the resistor 30 to the control terminal 38 rather than to the common node 20, positive feedback is achieved which makes the selection of values for the resistor 34 and for the resistor or diode 26 much less critical. When the gate 18 is nonconductive, the control terminal 38 can be considered to be short-circuited to the common node 20 by the low impedance resistor 28. However, when the gage 18 is conducting heavily, the control terminal 38 goes positive with respect to the common node 20. This positive voltage causes current to flow through the resistor 30 and into the base of the transistor 24. This current adds to the current flowing through the resistor 32 from the pulse generator 40 and thus represents positive feedback. The positive feedback is further enhanced by the fact that the emitter of the transistor 24 is driven negative with respect to the common node 20 by the voltage drop which appears across the load 16, as is explained above. If the element 26 is a diode, the emitter of the transistor 24 is effectively decoupled from the trigger node 38 once the trigger capacitor 54 is discharged and allows current flow through the resistor 34 to further discharge the capacitor 54. All of these elements in combination produces a circuit that has a high trigger sensitivity, an ability to fully discharge the trigger capacitor 54, and yet a circuit which operates properly even though some of the components may be out of tolerance. The resistors 30 and 32 must have a high enough resistance so that the positive pulses generated at the node 52 do not trigger the triggerable gate 18 when it is in its most sensitive condition.

The series circuit comprising a resistor 62 and a capacitor 60 is connected across the gate 18 to prevent "plug-in" and other line transients from causing misfirings due to a sudden rise in potential across the triggerable gate 18. The resistor element 28 also aids in providing some immunity to misfirings due to line transients.

Assuming now that a suitable supply of current is applied to the supply nodes 12 and 14, initially the trigger capacitor 54 charges up in the manner described above so that the end of the capacitor adjacent the switch 57 is negatively charged. When it is desired to supply power to the load 16, the switch 57 is thrown into the opposite position from that shown in FIG. 3. This connects the negative end of the trigger capacitor 54 to the common node 20. The next time the supply lead 12 goes positive with respect to the supply lead 14, a positive pulse is generated at the node 52 in the manner described above. This positive pulse causes current to flow through the resistor 32, and this current causes the transistor 24 to conduct. The transistor 24 connects the trigger node 21 to the positive side of the trigger capacitor 54. A positive current now flows through the resistor or diode 26 and into the control terminal 38 of the triggerable gate 18. The gate 18 now conducts and connects the load 16 directly across the supply nodes 12 and 14 for the remainder of the positive half cycle.

When the control rectifier 18 is conductive, the voltage which appears across the load 16 also appears across the series combination of resistor 28, resistor or diode 26, and resistor 34. Because of the voltage drop across resistor 28 and resistor or diode 26, the common node 20 is now positive with respect to the trigger node 21. Similarly, since the node 52 is either connected to the supply node 12 by the resistor 44 or else is connected to the common node 20 by the controlled rectifier 42, the node 52 is also positive with respect to the trigger node 21. Current therefore flows through the resistor 32 and keeps the transistor 24 in a conducting state, and simultaneously current flows out of the trigger capacitor 54 and into the common node 21. This current flow completely discharges the trigger capacitor 54 and may leave a residual charge that biases the common node 20 positive with respect to the collector 36 of the gate transistor 22.

At the end of the positive half cycle, the triggerable gate 18 turns off and stops the flow of current to load 16, with the possible exception of a transient current that flows momentarily through the elements 60 and 62. The switch 57 still connects the trigger capacitor 54 to the node 20, but now the trigger capacitor 54 is discharged, and it holds the collector 36 of the transistor 24 at roughly the potential of the common node 20. Thus, no current flows from the trigger capacitor 54 into the control terminal 38 of the rectifier 18. Since it would take at least two volts to overcome the junction potentials of the transistor 24, the diode 26, and the triggerable gate 18, a margin of insurance is provided which insures that the gate 18 does not fire a second time. Ultimately, when the switch 57 is returned to the position shown in FIG. 3, a charging path is reestablished for the trigger capacitor 54, and the capacitor 54 is recharged.

The capacitor 54 need be only large enough to hold sufficient charge to trigger the silicon controlled rectifier 18. In the present embodiment, this capacitor has a value of 0.2 microfarads. The capacitor 60 has a value of 0.1 microfarads. Thus, the circuit 10 is entirely free of any large or cumbersome capacitors. The use of a second gate 22 and a pulse generator 40 obviates the need for an electrolytic capacitor to maintain the silicon controlled rectifier 18 in a conducting state during negative half cycles (see, for example, U.S. Pat. No. 3,414,738). The silicon controlled rectifier pulse generator 40 also supplies a large enough negative potential to the charging current resistor 58 so that the trigger capacitor 54 can be substantially smaller than those previously used (see, for example, U.S. Pat. No. 3,179,866).

The improved operation of the circuit 10 is made possible in part by the positioning of the first gate 18 with respect to the load 16. In conventional circuits, the load 16 would always be connected between the first gate 18 and the supply node 12, rather than between the first gate 18 and the supply node 14. Such prior art arrangements have no way of supplying a reverse current to the trigger capacitor 54 through a resistor such as the resistor 34. The negative current flow through the resistor 34 when the triggerable gate 18 is conducting insures that the trigger capacitor 54 is always fully discharged before the end of the conduction cycle.

The following components are used in the preferred embodiment of the control circuit 10:

| No. | Name of Element | Value |
| --- | --- | --- |
| 18 | silicon controlled rectifier | 2N 3669 |
| 24 | transistor | 2N 4400 |
| 26 | resistor or diode | 47 ohms or 1N 4001 |
| 28 | resistor | 33 ohms |
| 30 | resistor | 3,300 ohms |
| 32 | resistor | 6,800 ohms |
| 34 | resistor | 4,700 ohms |
| 42 | silicon controlled rectifier | 2N 5060 |
| 44 | resistor | 18,000 ohms, 1 watt |
| 46 | resistor | 470,000 ohms |
| 48 | resistor | 15,000 ohms |
| 54 | capacitor | 0.2 microfarad, 100 volts AC |
| 57 | pushbutton switch | SPDT or SPST |
| 58 | resistor | 27,000 ohms |
| 60 | capacitor | 0.1 microfarad, 400 volts AC |
| 62 | resistor | 120 ohms |

What is claimed as new and desired to be secured by Letters Patent of the United States is:

1. A control circuit for energizing a load with half cycle pulses of current from an alternating current supply, said control circuit comprising:
   a first gate having a first control terminal and having two current terminals;
   a first series circuit including said gate and said load, said first series circuit connected across said alternating current supply;
   a second series circuit including a trigger capacitor, a switch, and a second gate having a second control terminal, said second series circuit connecting said first control terminal to one of said two current terminals; capacitor charging means connecting said switch and said capacitor to said supply through a rectifier for charging said capacitor whenever said switch is positioned to break said second series circuit; and pulse source means for supplying pulses to said second control terminal during the initial portions of supply current cycles of one polarity, wherein said pulse source means comprises a voltage sensitive breakdown device connected in series with a first resistive element across the supply and wherein said second control terminal is connected by suitable circuit means to the junction of said breakdown device with said resistive element.

2. A control circuit in accordance with claim 1 wherein the capacitor charging means comprise a second resistive element connected to the junction of said breakdown device with said first resistive element and arranged to supply a charging current to said trigger capacitor, and wherein said breakdown device breaks down in one direction only and thus serves as a rectifier for the capacitor charging means.

3. A control circuit in accordance with claim 1 wherein the breakdown device is a silicon controlled rectifier having a control terminal, and wherein the breakdown device also includes additional resistance elements connecting said control terminal to circuit nodes of such a potential that the breakdown device becomes conductive shortly after the start of alternate half cycles of the supply.

4. A control circuit in accordance with claim 3 wherein the charging means comprise a second resistive element connected to the junction of said breakdown device with said first resistive element and arranged to supply a charging current to said trigger capacitor, said breakdown device serving as a rectifier for the capacitor charging means.

5. A control circuit in accordance with claim 4 wherein the switch is a single pole single throw switch having two contacts, and wherein the trigger capacitor and said second resistive element connect to one of the contacts.

6. A control circuit in accordance with claim 4 wherein the switch is a single pole double throw switch having a wiper arm and two contacts, wherein the trigger capacitor is connected to the wiper arm of said switch, and wherein said second resistive element connects to one of the two contacts of said switch.

7. A control circuit in accordance with claim 1 wherein the second series circuit also includes a diode oriented so as to allow the flow of current to said first control terminal.

8. A control circuit in accordance with claim 1 to which has been added a positive feedback circuit connecting said first control terminal to said second control terminal.

9. A control circuit in accordance with claim 8 wherein said positive feedback circuit comprises a resistor.

10. A pulse generator for supplying an actuating potential to an electronic gate during the initial portions of supply current half cycles of one polarity, said gate closing in response to the actuating potential, said pulse generator comprising:
a voltage sensitive breakdown device comprising a silicon controlled rectifier having a control terminal, and having the control terminal connected to the supply current by resistive elements;
a resistive element;
a series circuit including the breakdown device and the resistive element connected across the supply current;
and circuit means connecting the breakdown device to the electronic gate for transmitting the potential developed across the breakdown device to the electronic gate.

11. A combination pulse generator and unidirectional current generator for generating pulses of one polarity during the initial portions of supply current half cycles of one polarity and for generating a current of the opposite polarity during supply current half cycles of the opposite polarity, comprising:
a source of alternating supply current having first and second supply nodes;
a silicon controlled rectifier having a control terminal and having first and second current terminals, said first current terminal being connected to said first supply node;
a resistive element connecting said second current terminal to said second supply node;
bias means for biasing said control terminal so that said silicon controlled rectifier becomes conductive shortly after the onset of supply current half cycles of one polarity, whereby pulses of that polarity are generated at said second current terminal;
and a circuit means connected to said second current terminal for receiving current during supply current cycles of the opposite polarity.

12. A combination pulse generator and unidirectional current generator in accordance with claim 11 wherein the circuit means comprises a series circuit which includes a resistor and a capacitor, and which connects said second current terminal to said first current terminal, whereby the capacitor may be charged to a potential level which is greater than the potential magnitude of said pulses.

13. A control circuit for energizing a load with half cycles pulses of current from an alternating current supply, said control circuit comprising:
a first gate having a first control terminal and having two current terminals;
a first series circuit including said gate and said load, said first series circuit connected across said alternating current supply;
a second series circuit including a trigger capacitor, a switch, and a second gate having a second control terminal, said second series circuit connecting said first control terminal to said alternating circuit supply;
capacitor charging means connecting said switch and said capacitor to said supply through a rectifier for charging said capacitor whenever said switch is positioned to break said second series circuit;
and pulse source means for supplying pulses to said second control terminal during the initial portions of supply current cycles of one polarity, wherein the pulse source means comprises a voltage sensitive breakdown device connected in series with a first resistive element across the supply and wherein said second control terminal is connected by suitable circuit means to the junction of said breakdown device with said resistive element.

14. A control circuit in accordance with claim 13 wherein the capacitor charging means comprise a second resistive element connected to the junction of said breakdown device with said first resistive element and arranged to supply a charging current to said trigger capacitor, and wherein said breakdown device breaks down in one direction only and thus serves as a rectifier for the capacitor charging means.

15. A control circuit in accordance with claim 13 wherein the breakdown device is a silicon controlled rectifier having a control terminal, and wherein the breakdown device also includes additional resistance elements connecting said control terminal to circuit nodes of such a potential that the breakdown device becomes conductive shortly after the start of alternate half cycles of the supply.

16. A control circuit in accordance with claim 15 wherein the capacitor charging means comprise a second resistive element connected to the junction of said breakdown device with said first resistive element and arranged to supply a charging current to said trigger capacitor, said breakdown device serving as a rectifier for the capacitor charging means.

17. A control circuit in accordance with claim 16 wherein the switch is a single pole single throw switch having two contacts, and wherein the trigger capacitor and said second resistive element connect to one of the contacts.

18. A control circuit in accordance with claim 16 wherein the switch is a single pole double throw switch having a wiper arm and two contacts, wherein the trigger capacitor is connected to the wiper arm of said switch, and wherein said second resistive element connects to one of the two contacts of said switch.

19. A control circuit in accordance with claim 13 wherein the second series circuit also includes a diode oriented so as to allow the flow of current to said first control terminal.

20. A control circuit in accordance with claim 13 to which has been added a positive feedback circuit connecting said first control terminal to said second control terminal.

* * * * *